July 7, 1936.    C. H. KINDL ET AL    2,046,690
SHOCK ABSORBER
Filed May 31, 1934    2 Sheets-Sheet 1

INVENTORS
CARL H. KINDL
AND CHARLES S. McCANN
BY
ATTORNEYS

July 7, 1936.  C. H. KINDL ET AL  2,046,690
SHOCK ABSORBER
Filed May 31, 1934   2 Sheets-Sheet 2

INVENTORS
CARL H. KINDL
AND CHARLES S. McCANN
BY
ATTORNEYS

Patented July 7, 1936

2,046,690

UNITED STATES PATENT OFFICE 2,046,690

SHOCK ABSORBER

Carl H. Kindl and Charles S. McCann, Dayton, Ohio, assignors to General Motors Corporation, Detroit, Mich., a corporation of Delaware Application May 31, 1934, Serial No. 728,323

10 Claims. (Cl. 188—88)

This invention relates to improvements in hydraulic shock absorbers.

It is among the objects of the present invention to provide a hydraulic shock absorber adapted to control the relative movements between the frame and axle of a vehicle in accordance with the nature of the roadbed over which the vehicle is being operated.

A further object of the present invention is to adjust the shock absorber to vary its resistance to the movement of the body carrying frame of the vehicle in response to and proportionately with the accelerations in such movement of the body carrying frame.

Further objects and advantages of the present invention will be apparent from the following description, reference being had to the accompanying drawings wherein a preferred embodiment of one form of the present invention is clearly shown.

Figure 1:
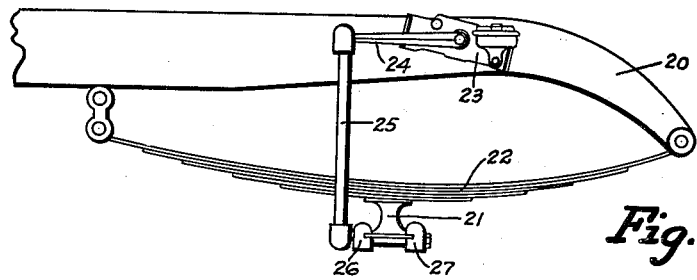
Fig. 1 is a fragmentary side view of the vehicle chassis, with wheels removed, a shock absorber equipped with the present invention being shown applied thereto.

Referring to the drawings, the numeral 20 designates the frame of the vehicle which is supported upon a vehicle axle 21 by springs 22, one of which is shown. The shock absorber 23 is shown attached to the vehicle frame in any suitable manner, this shock absorber having an operating arm 24, the free end of which is swivelly secured to one end of a link 25, the opposite end of said link being swivelly attached to a bracket 26 anchored to the axle 21 by the clamping member 27.

The shock absorber 23 has a casing providing a cylinder 30, opposite ends of which are closed by cylinder head caps 31 and 32 which are properly gasketed to prevent fluid leaks. Within this cylinder there is provided a piston comprising two piston head portions 33 and 34, secured to each other, so as to be capable of moving toward and away from each other, by bolts 35 and 36, the bolt 35 threadedly engaging the piston head portion 34 and slidably extending through an opening in the piston head portion 33 and having a spring 37 under its head which yieldably urges the two piston head portions together. The bolt 36 threadedly engages the piston head portion 33 and slidably extends through an opening in the piston head portion 34, a spring 38 acting in a manner similar to spring 37, that is, urging the two piston head portions toward each other.

The adjacent faces or ends of the piston head portions 33 and 34 have cut-away portions forming a recess 40 between the piston heads, each recess receiving the end of a cam 41 which cam is secured to cross shaft 42 journalled transversely of the shock absorber casing. This cam 41 engages wearpieces 43 and 44 carried on the respective pistons 33 and 34. Shaft 42 has one end extending from the shock absorber to which is secured the shock absorber operating arm 24.

From the aforegoing description it will be seen that, in response to movements of the axle 21 toward or away from the frame 20, the connections between the axle and shaft 42 will cause clockwise or counter-clockwise movement of the cam 41, resulting in a movement of the piston toward the left or right respectively.

The piston, comprising heads 33 and 34, forms two fluid displacement chambers within the cylinder 30, the one designated by the numeral 50 being termed "the spring compression control chamber", and the chamber 51 "the spring rebound control chamber". Each piston head portion 33 and 34 is equipped with fluid flow control devices, and inasmuch as both are identical, only one will be described detailedly for the sake of brevity.

Referring particularly to the piston head portion 33, we find that it has a passage 52 providing for the transfer of fluid from the chamber 50 into the intermediate chamber 53 provided in the shock absorber casing and which may be termed "the fluid reservoir" inasmuch as this intermediate chamber extends across the intermediate portion of the shock absorber casing. Within this passage 52 an annular ridge 55 forms a valve-seat normally engaged by the intake valve 56 under the influence of a spring 57, which is interposed between the valve 56 and abutment ring 58 seated within a groove 59 in the inner wall of the piston head 33. Valve 56 has a tubular body portion 60 in which is slidably supported the stem portion 61 of the pressure relief valve 62 which is in the form of a head secured to said stem and which is maintained in engagement with the outer surface of valve 56 by a spring 62a, interposed between the valve 56 and an abutment collar 63 secured to the outer end of the stem 61. A longitudinal groove 64 is provided in the stem 61 of valve 62, this groove normally lying within the confines of the body portion 60 of valve 56. However, in response to pressure, valve 62 is moved from valve 56 and consequently this groove 64 provides communication between the chamber 50 and the portion of the valve passage 52 on the opposite side of valve 56 and thus provides for a restricted flow of fluid from the chamber 50 to the interior chamber 53. The passage in piston head portion 34, comparable to the passage 52 in piston head portion 33, is designated by the numeral 72. The intake valve like valve 56 in piston head portion 33, is designated by the numeral 76 in piston head portion 34. The pressure relief valve of this piston head portion 34 is designated by the numeral 77.

From the aforegoing it may be seen that piston head portions 33 and 34 provide outlet ports as well as inlet ports for the respective chambers 50 and 51.

Chamber 51 has another port 80 leading therefrom into a valve chamber 81, the seat 82 therein being normally engaged by valve 83 yieldably urged upon said seat 82 by spring 84 which is interposed between the valve and a screw plug 85 threadedly received by a lug 86 formed on the casing of the shock absorber. This port 80 is the second outlet port for the chamber 51.

The shock absorber casing has a recess providing a chamber 90 in which the automatic control mechanism of the shock absorber is housed. In the bottom of chamber 90 there is a threaded counterbore 91 which is in communication with the valve chamber 81. The threaded counterbore 91 receives the threaded end of a tubular standard 92, rigidly holding said standard concentric with the chamber 90. Adjacent the end of the standard 92, received by the counterbore 91, there is a restricted throat portion 93, which slidably supports the fluid flow control device or valve 94 which, only by the force of gravity, normally rests upon the tubular valve-seat member 95 threadedly received by the end of the standard 92 fitting into the counterbore 91. The chamber 96, formed between the valve-seat 95 and the restricted throat portion 93 in which the valve 94 is slidably supported, is in communication with chamber 90 through a passage 97 provided in the wall of the standard 92. Somewhat above this passage 97 and in the wall of the standard 92 is another side opening 98, the purpose of which will be described.

The end of the standard 92 opposite the end received by counterbore 91 is exteriorly threaded to receive the nut 99 which closes this end of standard 92 and which is used also to clamp the cover 100 upon the casing to close chamber 90. A cross-pin 101 is provided at the end of the standard 92 adjacent the cover screw 99, this cross-pin 101 pivotally supporting one end of arm 102 within the standard 92, which arm is one member of a toggle joint. The opposite end of the arm is angular, providing a projecting lip 103 which extends through the side opening 98 in standard 92 to the outside thereof. To this arm 102 the second arm 104 of the toggle is pivotally secured as at 105. The free end of arm 104 has a reduced extension 106 which lies within a recess 107 in the end of valve 94. Normally, however, the end of this portion 106 of arm 104 does not press against the valve 94, but is spaced therefrom in order to permit fluid pressure, acting through the valve-seat 95 from the valve chamber 81, to lift valve 94 from engagement with seat 95 and thus permit a restricted flow of fluid past the valve 94 through the passage 97.

Figure 3:
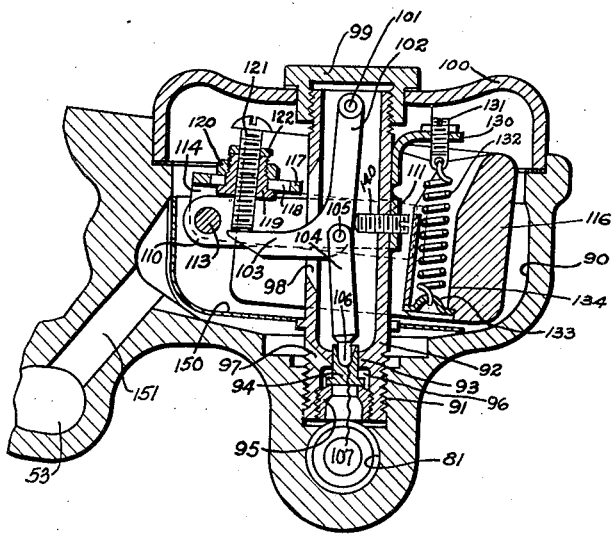
Fig. 3 is a fragmentary detail sectional view taken substantially along the line 3—3 of Fig. 5, showing the automatic control device of the shock absorber. In this view the fluid flow control device is in maximum fluid restricting position.
Figure 4:
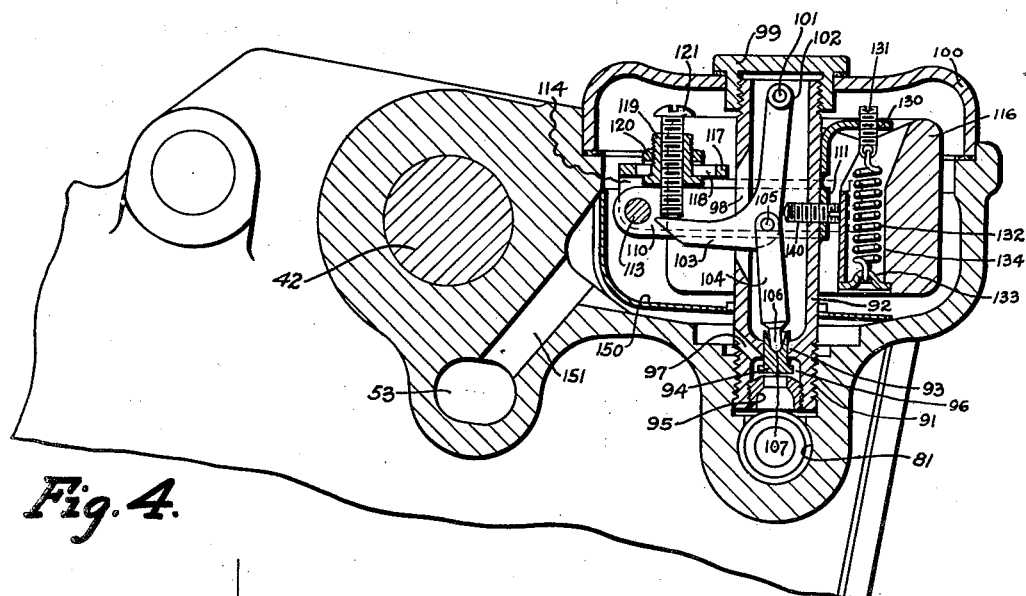
Fig. 4 is a view similar to Fig. 3, however, in this view the fluid flow control device is shown in the normal position in which a minimum restricted flow of fluid is permitted thereby.
Figure 5:
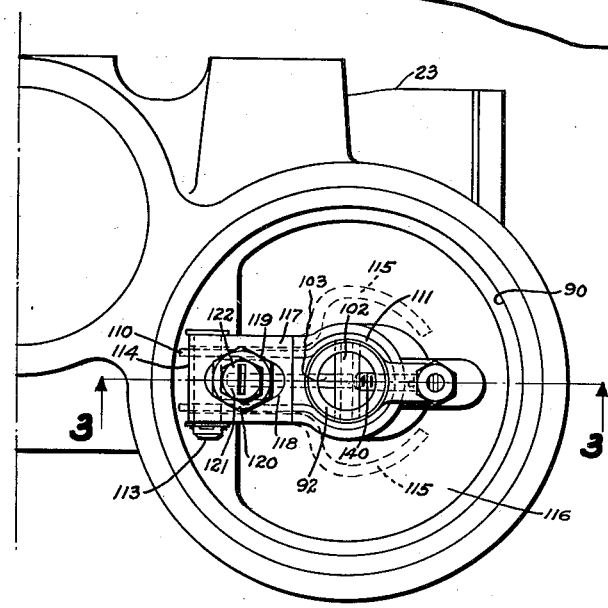
Fig. 5 is a fragmentary plan view of the automatic control device.

A bracket 110 has a ring-shaped portion 111 secured to the standard 92 in any suitable manner, preferably by welding, so that the bracket 110 is rigidly held by the standard within the chamber 90. In Fig. 5 it may be seen that this bracket 110 has two spaced arms which support the pivot pin 113. Pin 113 pivotally carries a bracket 114 which has diverging arm portions 115 embedded in the inertia weight element 116. This bracket 114 has a platform portion 117 provided with an elongated slot 118 for adjustably receiving a hollow nut 119. Hollow nut 119 is maintained in adjusted position on a platform 117 of the bracket 114 by a lock nut 120. The hollow nut 119 threadedly receives the adjustable stop screw 121 which is locked in adjusted position on the hollow nut 119 by the lock nut 122. The end of the screw 121 as shown in Figs. 3 and 4 is adapted to engage the angular lip or extending portion 103 of the toggle arm 102.

On the standard 92 there is also secured a bracket 130 adjustably carrying the abutment screw 131. One end of a spring 132 is secured to this abutment screw 131, the opposite end of said spring 132 being anchored to a saddle member 133 carried in the bottom end of an opening 134 provided in the weight 116. Spring 132 resiliently suspends the weight 116 in normal position as shown in Fig. 4 to permit said weight to move relatively to the shock absorber casing in response to accelerations in the movement of the shock absorber upwardly. A screw 140 threadedly received by the standard 92 lies in the path of movement of the toggle joint arm 102 and limits its movement in one direction.

Chamber 90 has a baffle plate 150 provided therein surrounding the standard 92 in such a manner that when fluid is ejected from the side opening 97 in standard 92 it cannot be directed against the weight to effect a lifting thereof due to fluid pressure. This chamber 90 is in communication with the intermediate chamber 53 through a passage 151.

Figure 2:
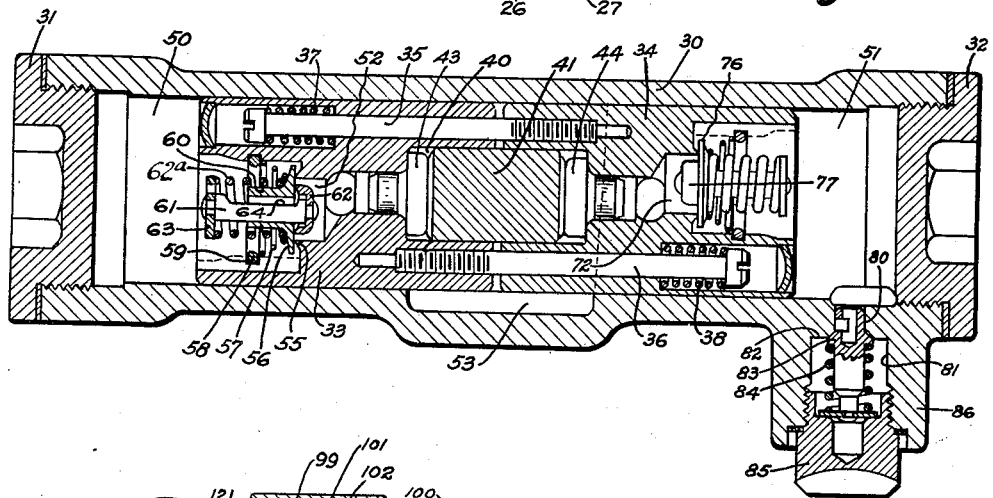
Fig. 2 is a longitudinal sectional view taken through the cylinder of the shock absorber and clearly illustrating the fluid displacement means and certain of the fluid flow control devices of the shock absorber.

The shock absorber functions in the following manner:

Assuming that the roadwheels of the vehicle strike an obstruction in the roadway and suddenly thrust axle 21 toward the frame 20, spring 22 is moved through its compression stroke and, in response to this upward movement of axle 21, the shock absorber operating arm 24, its shaft 42 and cam 41, will be moved clockwise, resulting in a movement of the piston toward the left as regards Figs. 1 and 2. Fluid within the intermediate chamber 53 exerting a force through passage 72 of piston head portion 34 will move the valve 76 from its seat to establish a substantially free flow of fluid into the chamber 51. At the same time the piston, in traveling toward the left, will exert a pressure upon the fluid within the spring compression control chamber 50, which pressure, when attaining a predetermined high value, will move valve 62 from engagement with valve 56 to provide for a restricted flow of fluid from chamber 50 through the longitudinal groove 64 in valve standard 61 past valve 62 through passage 52 into the intermediate chamber 53. This restriction to the fluid flow from chamber 50 past the shock absorber provides a resistance to the compression movement of spring 22.

The upward thrust of the spring 22 will cause an upward movement of the frame 20 and as soon as the spring 22 begins its rebounding movement, a reverse motion of the piston obtains, consequently there is established a substantially free flow of fluid past valve 56 into the chamber 50 and, due to the movement of the piston 34 to the right, a pressure will be exerted upon the fluid within the spring rebound control chamber 51. Valve 83, being urged upon its seat by a comparatively light spring, comparison being made to the springs of valves 62 and 77, a comparatively low fluid pressure within chamber 51 will move valve 83 from its seat to establish a flow of fluid from chamber 50 through outlet port 80 into the valve-chamber 81. From here the fluid pressure acting through the valve-seat 95 against valve 94 will move said valve upwardly so that it is moved into engagement with the end of portion 106 of toggle arm 104, as shown in Fig. 4, thereby providing for a restricted flow of fluid through the valve-seat 95 past valve 94 into the chamber 96 from whence the fluid flows through passage 97, in standard 92, into the chamber 90 and back to the intermediate chamber 53 via the passage 151. If the piston movement toward the right exerts an excessive pressure upon the fluid within chamber 51, which pressure cannot be properly relieved by the opening of valve 83 and the movement of valve 94 from its seat, then valve 77 is moved from engagement with valve 76 and it establishes a restricted flow of fluid from chamber 51 directly through the piston passage 52 into the intermediate chamber 53.

If the upward movement of the body carrying frame 20 is accelerated to a predetermined degree, such accelerations resulting in an uncomfortable and disagreeable ride to the occupant of the vehicle, then the inertia weight 116 will be moved relatively to the casing, or more particularly the inertia weight 116 will stand still while the casing for the shock absorber is accelerated upwardly with the body carrying frame 20. This resultant relative movement between the weight 116 and the casing causes a clockwise rotation of the weight around the pivot pin 113 supported by bracket 110 and consequently screw 121 will be moved downwardly and, as said screw engages the extended portion 103 of toggle arm 102, it will rotate said toggle arm counter-clockwise about its pivotal support 101.

This results in a counter-clockwise movement of the pivotal point 105 where arm 104 is pivotally supported on arm 102 and thus the upper end of the arm 104 is moved clockwise so that the distance between end 106 of arm 104 and the pivotal point 101 of arm 102 will be increased and consequently the engagement of end 106 of arm 104 with valve 94 will move said valve downwardly toward its valve-seat 95. If the movement of the weight 116 downwardly is sufficient it will move the valve 94 directly against the valve-seat 95 and completely cut off fluid flow through said valve-seat. However, if the acceleration upwardly of the shock absorber is less then the weight 116 will move valve 94 only to restrict the fluid flow through seat 95 to a degree proportionately to and in accordance with the accelerative movement of the body carrying frame 20 to which the shock absorber casing is attached.

The leverage provided by the connections between the weight 116 and the valve 94 is such that the force of the weight 116 acting downwardly is multiplied by the time it is exerted upon the valve 94 so that a comparatively light downward force of the weight may overcome a comparatively high pressure acting against the valve 94 to move it in the opposite direction. These leverages may be varied by the adjustment of the hollow nut 119 on the platform 117 longitudinally of the slot 118. Other adjustments may be made by threading the screw 121 into and out of said hollow nut 119.

From the aforegoing it may be seen that applicants have provided an automatic control for a shock absorber, adapted automatically to adjust the fluid flow control device of the shock absorber to vary its resistance to body and axle movements in response to and in accordance with the nature of the roadbed over which the vehicle is being operated.

The shock absorber is adjusted proportionately to the accelerations in the movement of the body carrying frame upwardly so that these upward accelerations are properly controlled to overcome the disagreeable and undesirable upward thrust which results in an uncomfortable ride.

Applicants have provided a mechanical connection between their inertia weight and the valve which it controls, which mechanical connection multiplies the force applied by the weight whereby a light force exerted by the inertia weight may overcome a comparatively greater force exerted upon the valve in the opposite direction by fluid pressure, the connections adjusting the valve proportionately to accelerations.

While the embodiment of the present invention constitutes a preferred form, it is to be understood that other forms might be adopted, all coming within the scope of the claims which follow.

What is claimed is as follows:

1. A hydraulic shock absorber having a fluid displacement chamber provided with outlet ports; means adapted to urge the fluid from said chamber; a fluid flow control device for each outlet port; a spring normally urging each of said devices to close its port; an inertia weight; an inertia weight controlled valve adapted to restrict the flow of fluid permitted by the control device of one of said ports and a toggle lever interposed between the weight and valve.

2. A hydraulic shock absorber having a fluid displacement chamber provided with an outlet port; a fluid displacement member; a fluid flow control device for said port, yieldably urged, normally to close the port; a valve adapted to be actuated to restrict the flow of fluid permitted by the fluid flow control device of said port; a resiliently suspended inertia weight, and a toggle comprising two levers hinged together, adapted to be moved by the weight to actuate the said valve.

3. A hydraulic shock absorber having a fluid displacement chamber provided with outlet passages; a fluid displacement member; a fluid flow control device normally closing each passage, one being spring loaded, the other held in normal passage closing position by gravity; an inertia weight; and a toggle lever engaged by the weight and providing an adjustable stop adapted to be actuated by the weight to limit the movement of the gravity valve from its passage for restricting the flow of fluid therefrom in accordance with the movement of the weight.

4. A hydraulic shock absorber having a fluid displacement chamber provided with discharge passages; a fluid displacement member; two valves, one spring loaded normally to close its outlet passage; an inertia weight adapted to urge the second valve to restrict the flow of fluid through its passage in accordance with accelerations in the movement of the shock absorber; and a toggle, one lever of which is adapted to be engaged by the weight, the other being adapted to engage the second valve for multiplying the effect of said weight upon said valve.

5. A hydraulic shock absorber having a fluid displacement chamber provided with outlet passages; a fluid displacement member; two valves, one spring loaded normally to close one of said outlet passages; an inertia weight adapted to urge the second valve to restrict the flow of fluid through its passage in accordance with accelerations in the movement of the shock absorber; and pivoted levers providing a mechanical connection between the weight and second valve, adapted to multiply the pressure exerted by the weight.

6. A hydraulic shock absorber having a fluid displacement chamber provided with outlet passages; a fluid displacement member; two valves, one spring-loaded normally to close its passage; an inertia weight adapted to urge the second valve to restrict the flow of fluid through its passage in accordance with accelerations in the movement of the shock absorber; and a toggle joint, one arm of which is engaged by the weight, the other being adapted to engage the second valve, for multiplying the effect of the pressure by the weight upon the valve.

7. A hydraulic shock absorber having a fluid displacement chamber provided with outlet passages; a fluid displacement member; two valves, one spring-loaded normally to close its passage; an inertia weight adapted to urge the second valve to restrict the flow of fluid from its passage in accordance with accelerations in the movement of the shock absorber; a toggle joint, one arm of which is adapted to engage and actuate the second valve; and means adjustably carried by the weight for engaging the other arm of the toggle, adjustment of said means varying the multiplication of the effective weight pressure upon the valve by said toggle joint.

8. A hydraulic shock absorber having fluid circulating means; spring loaded means for controlling said fluid circulation; an inertia weight; a valve adapted to be actuated by said inertia weight to restrict fluid circulation permitted by a spring loaded means; and mechanical, force multiplying means comprising a toggle for operatively connecting the inertia weight with the said valve.

9. A hydraulic shock absorber having fluid circulating means; a spring-loaded valve for controlling said fluid circulation; an inertia weight pivotally supported in the shock absorber; a spring resiliently suspending said weight; a second valve normally providing a predetermined restriction to fluid flow and adapted to be actuated by the weight to increase its restriction to fluid circulation; and a force multiplying toggle joint interposed between the weight and second valve for adjusting the valve to vary its restriction in accordance with the movement of the weight.

10. A hydraulic shock absorber having a fluid displacement chamber provided with an outlet passage; a fluid flow control valve for said passage; a toggle joint, one lever of which engages said valve; an inertia weight adapted to actuate the toggle joint to adjust the valve for varying its control of the fluid flow from said outlet passage proportionately to accelerations in the movements of the shock absorber; and a spring loaded valve in said outlet passage, adapted to be actuated by fluid pressure to render the inertia weight controlled valve effective.

CARL H. KINDL.
CHARLES S. McCANN.